July 31, 1923.
V. F. KING
ALTERNATING CURRENT RECTIFIER
Filed Feb. 5, 1921
1,463,779
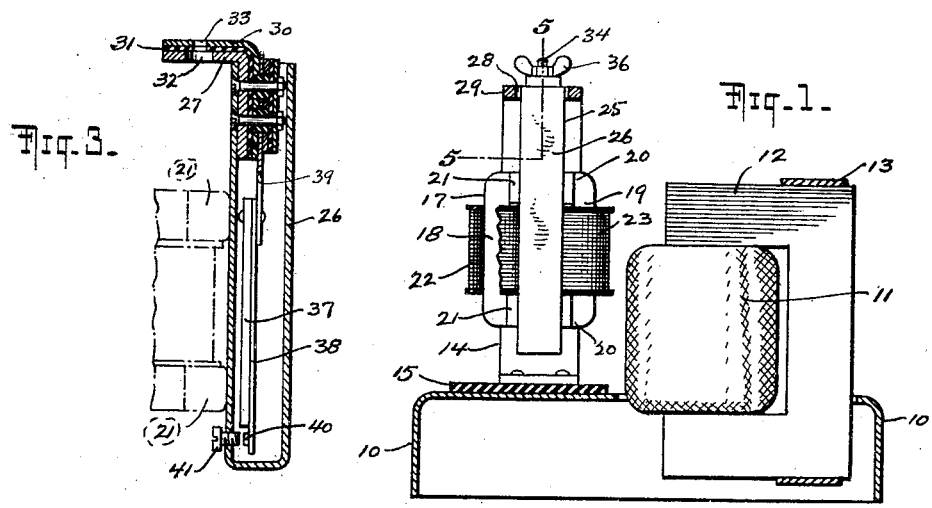
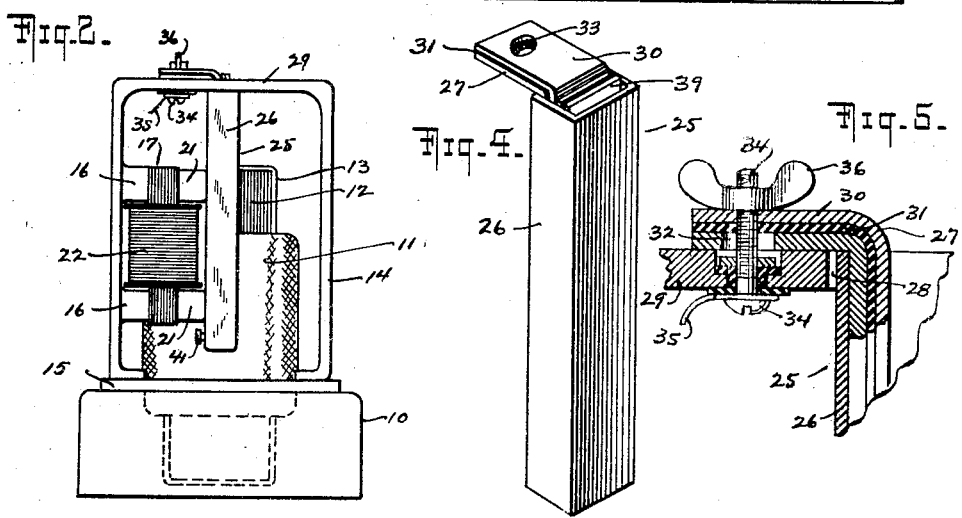
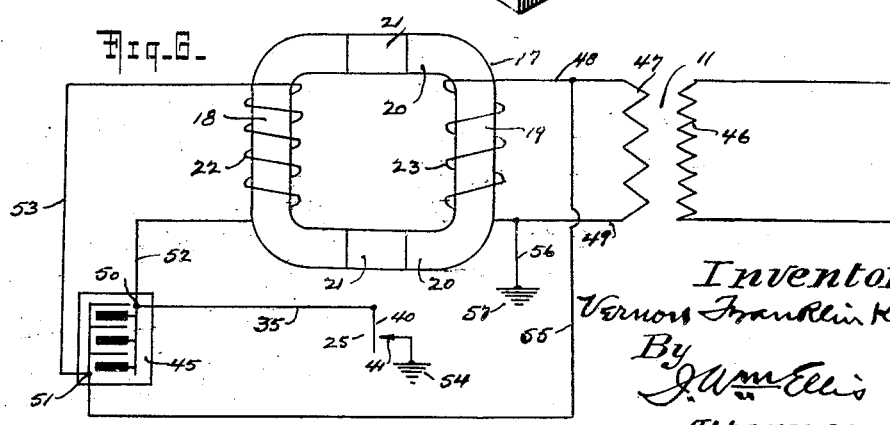
Inventor
Vernon Franklin King
By J. Wm Ellis
Attorney

Patented July 31, 1923.

1,463,779

UNITED STATES PATENT OFFICE.

VERNON FRANKLIN KING, OF TONAWANDA, NEW YORK, ASSIGNOR TO KING ELECTRIC MANUFACTURING COMPANY, INC., OF BUFFALO, NEW YORK, A CORPORATION OF NEW YORK.

ALTERNATING-CURRENT RECTIFIER.

Application filed February 5, 1921. Serial No. 442,677.

*To all whom it may concern:*

Be it known that I, VERNON FRANKLIN KING, a citizen of the United States of America, and a resident of the city of Tonawanda, county of Erie, and State of New York, have invented certain new and useful Improvements in Alternating-Current Rectifiers, of which the following is a full, clear, and exact description.

My invention, in general, relates to a device for converting an alternating current into a direct current, and more particularly to a device of this nature which is applicable for the charging of storage batteries.

Some of the principal objects of my invention have been to provide a device which shall be cheap to manufacture; simple and efficient in its operation; and having a minimum number of parts, so arranged that the device shall not easily get out of order.

Another object has been to provide a separable vibrating element for my device which may easily be replaced by anyone when necessary or desirable.

Another object has been to provide a device in which the vibrator shall receive a substantially uniform amount of current, irrespective of the increased current produced by an increase of line voltage.

The above objects and advantages have been accomplished by the device shown in the accompanying drawings, of which:

Fig. 1 is a side elevation of my device, partly in section.

Fig. 2 is an end elevation thereof.

Fig. 3 is an enlarged, sectional view of the vibratory unit of my device.

Fig. 4 is a perspective view of the same.

Fig. 5 is an enlarged, fragmentary, sectional view, taken on line 5—5 of Fig. 1.

Fig. 6 is a diagrammatical view, showing the electrical connections and circuits of my device.

The device comprises a base 10 having a transformer 11 arranged at one side thereof. This transformer is provided with a core 12 and is held in place preferably by means of a yoke 13. This transformer is of the usual and well known type, which is designed to step down the voltage of the line current to the voltage of the battery, and, therefore, need not be further described.

Arranged at the opposite side of the base 10 is a metallic standard or support 14 which rests upon an insulating plate 15, suitably secured to the base. This support is provided with two inwardly projecting pads 16 to which the core 17, forming the magnetic field of my device, is secured. This core is preferably of the laminated type and is formed with two vertical legs 18 and 19 which are connected at their top and bottom ends by means of the yoke pieces 20, thus providing a closed magnetic path. 21 are magnetic pole pieces, which extend inwardly from the center of the yoke pieces 20 so that they will be in vertical alinement, one with the other.

Arranged on the vertical leg 18 of the magnetic core 17 is a coil of wire 22. Likewise arranged on the vertical leg 19 of the core, is a coil of wire 23. The coils 22 and 23 are connected, respectively, to the battery being charged and to the transformer 11, in a manner and for a purpose to be hereinafter described. For clearness in this specification and the appended claims, the coils 22 and 23 are termed an exciting coil and an actuating coil, respectively.

25 is the vibratory unit of my device which is shown enlarged in Figs. 3, 4 and 5, to which reference is now made. This vibratory unit comprises preferably an outer casing 26 which is attached to the lower depending leg of an angularly-shaped member 27. The vibratory unit is suspended from and supported by the standard 14 and the outer casing 26 is disposed through an aperture 28 formed in the upper cross-piece 29 of the standard 14. The lateral leg of the angularly-shaped member 27 is disposed on top of the cross-piece 29 and keeps the vibratory unit in the desired position. A second angularly-shaped member 30 is arranged on top of the member 27 and insulated therefrom by a strip of insulating material 31. The lateral legs of the angularly-shaped members 27 and 30 are provided, respectively, with apertures 32 and 33 so that these legs may be passed over a screw 34, which is carried by the cross-piece 29 of the yoke and is in registering position with the apertures as the vibratory unit is passed down through the opening 28 in the cross-piece. The screw 34 is rigidly secured in the cross-piece 29 and is insulated therefrom. The aperture 32 in the member 27 is sufficiently large so that it does not contact with the screw 34, while the aperture 33, in the member 30 is of such a size that it will contact and be electrically connected with the screw. Thus, it will be seen that the member 27 will be electrically connected with the standard 14 and the member 30 will be electrically connected with the screw 34. The screw 34 is connected by means of a lead 35 to the battery being charged as will be more fully described hereinafter. A wing nut 36 is arranged on the outer end of the screw 34, whereby the vibratory unit may be detachably held in place. Arranged within the outer casing 26 of the vibratory unit is an armature 37 which is so disposed that it will face and be preferably opposite the pole pieces 21 of the magnetic core. Arranged at the back of this armature is a spring plate 38; and the armature 37 and the plate 38 are secured at their upper ends to a flat spring member 39. The upper end of this member is secured mechanically and connected electrically with the depending leg of the angularly shaped member 30. Arranged at the lower end of the plate 38 is an electric contact element 40 which is arranged in juxtaposition with a contact screw 41, carried by the outer casing 26. The contact 40 and contact screw 41 are arranged on the side of the plate 38 which is adjacent the armature 37 so that when a magnetic flux is passing across the pole pieces 21, the armature 37 will be attracted and draw the contact 40 in engagement with the contact screw 41. The armature, being connected with the plate 38 at its upper end, it will be evident that the armature 37 may be drawn beyond a point where the contact element 40 engages with the screw 41, thus preventing a harsh impact of the contact elements, which greatly increases the life of these elements. When the casing is used to close the vibratory unit it is obvious that the portion thereof which lies between the armature 37 and the pole pieces 21 is of non-magnetic material. If the front portion only of the casing is used as a means for supporting the contact screw 41 it may be of any desired material.

It is obvious from the foregoing, that the vibratory unit, which is the part of rectifying devices that most readily gets out of order, can, in my device, be removed and quickly replaced by anyone, even though they are not familiar with devices of this nature, without having to disturb any connections whatsoever. In making a change of vibratory unit, it is only necessary to remove the wing nut 36, at the top of the screw 34, and lift the unit out of the device, a new one being substituted in its place in a reverse manner. When the wing nut 37 is drawn down tightly upon the top of the member 30, all electrical connections are made. I, of course, provide my rectifier with an outer casing (not shown) and the construction is of such a nature that the casing may be sealed while allowing the vibratory unit to be accessible without disturbing the seal on the casing. The vibratory unit is preferably entirely enclosed so that it cannot be tampered with and it may be sealed if desired. This makes it possible for a customer to remove and return the vibratory unit to the manufacturer and get a new one at a small cost. While, in some cases, it is preferable to have the vibratory unit entirely enclosed by a casing, it is obvious that the casing may be omitted without affecting the accuracy of the unit, the principal object being to provide a unit that can be easily removed without having to disconnect any wires.

Reference is now to be had to Fig. 6, where I show in diagram the electrical circuits and connections of my device. 45 is the storage battery which is to be charged by the device. 46 is the primary winding of the transformer 11 which is connected to the line that is supplying current to the device. 47 is a secondary winding of the transformer 11 which has its ends connected to the ends of the actuating coil 23, disposed on the core 17, by means of leads 48 and 49. The ends of the exciting coil 22 of the core 17 are connected to the battery terminals 50 and 51 by means of leads 52 and 53, respectively. In this figure the contact element 40 with its connected armature 37, its spring plate 38 and its spring 39, are represented by the vertical line which is given a number corresponding to the number of the contact 40. The outer casing 26, of the vibrating unit and the contact screw 41 thereof are represented in Fig. 6 by the arrow there shown, which is given the number corresponding to the screw 41. As hereinbefore described, the angularly-shaped member 27 is connected to the standard 14 which grounds the screw 41 with the yoke. It is to be understood, however, that the standard 14 is insulated from the base 10. The contact screw 41 in Fig. 6 is, therefore, shown grounded at 54. The battery terminal 51 is connected with the lead 48 by means of a lead 55; and the contact screw 41 is connected to the lead 49 through the ground 54, and a lead 56, which is grounded at 57 to the standard 14.

With the foregoing connections and circuits, it will be clear, that the vertical leg 18 of the core 17 will be energized by the battery 45 and that lines of force will be caused to flow through this leg of the core in accordance with the polarity of the battery. In a similar manner, the vertical leg 19 of the core 17 will be energized by the current coming from the secondary winding 47 of the transformer, and lines of force will be caused to flow through this leg in accordance with the direction of the flow of current produced in the actuating coil 23. Assuming that the battery polarity and exciting coil 22 is such as to cause the upper end of the vertical leg 18 to be of north polarity and the lower end thereof to be of south polarity, and assuming that momentarily current in the secondary winding 47 of the transformer is such that the magnetic lines of force produced in the leg 19 by the actuating coil 23 are such that the upper end of this leg of the core will be of south polarity and the lower end thereof of north polarity, it will be clear that the lines of force in both vertical legs will be flowing in the same circular direction and will unite and flow freely through the core 17. When, however, the direction of current in the coil 23 changes, due to the alternations of the current in the secondary winding 47 of the transformer, it is evident that the upper end of the vertical leg 19 will be of north polarity and the lower end will be of south polarity. This will produce a magnetic flux in this leg which will be opposite to the constant flux produced in the leg 18 and will counteract this flux, thus causing the flux from both windings to be diverted through the pole pieces 21 and through the armature 37 of the vibratory unit. During the time that the flux is diverted, it will be clear that the contact element 40 will be drawn into engagement with the contact screw 41 and close a circuit in which current will flow from the primary winding 47 of the transformer as follows: from lead 48 to the terminal 51 of the battery over lead 55, returning to lead 49 from the terminal 50 of the battery over lead 35, contact element 40, contact screw 41, ground 54 (outer casing 26, and angularly-shaped member 27 of the vibratory unit and the metallic standard 14) ground 57 and lead 56. The exciting winding 22 and the actuating winding 23 are, of course, such that when this circuit is closed through the path just above described, the current coming from the winding 47 will be unidirectional with the current of the battery. It will be clear that when the contacts of the vibratory unit are closed, and the current from the winding 47 is flowing through the circuit just above described, the windings 22, 23, and 47, will be connected in multiple with the battery 45. It is, of course, obvious, that this flow of current is used to charge the storage battery. Just as soon as the cycle of the alternating current changes so as to make the polarity of the leg 19 as first above described, the flux, which has been diverted through the poles 21, will again flow through the closed core 17 and allow the contacts 40 and 41 to be separated, thus opening the above described circuit, through which the current from the charging source is flowing in a direction opposite to that of the polarity of the battery. When this circuit is opened the lines of force produced by the coils 22 and 23 will again flow in the same direction, the core being large enough in cross-section to carry the flux produced by these coils.

My device is so constructed that a definite amount of flux will be diverted and pass through the armature 37, thus producing a flow of current to the battery which is of substantial constant value, irrespective of an increase of voltage in the line current. This is accomplished by reason of the fact that if the magnetic flux produced in the leg 19 is greater than the flux produced in the leg 18, this added flux will flow through the leg 18 in a direction opposite to the flux produced therein.

It is, of course, obvious that suitable resistances may be employed for the purpose of cutting down the amperage supplied to the battery when the line voltage is increased or to step the phase of the alternating current ahead so that the battery may get the maximum amount of current during the charging cycle. If desired, the pole pieces 21 may be omitted and the side faces of the yoke pieces 20 be used as poles for the leakage flux. In the claims, these side faces are referred to as leakage flux poles. The foregoing modifications of the details herein shown and described, as wells as others which will be apparent to those skilled in the art, may be made without departing from the spirit of my invention or the scope of the appended claims; and I do not, therefore, wish to be limited to the exact embodiment herein shown and described, the form described being merely a preferred embodiment thereof:

Having thus described my invention, what I claim is:

1. In an alternating current rectifier, the combination with a magnetic core, having pole pieces, of a support carrying the core and pole pieces, a separable vibratory unit arranged across the pole pieces and detachably carried by the support, the vibratory unit comprising a casing, a member secured to the casing, a second member carried by and insulated from the first member, a vibrating armature carried by the second member, contact means connected with the casing and the armature, and means carried by the support for electrically connecting the members of the unit with the electric circuits of the rectifier.

2. In an alternating current rectifier, the combination with a magnetic core, having poles, of a support carrying the core, a separable vibratory unit arranged across the poles and detachably carried by the support, the vibratory unit comprising an attaching member, a second attaching member insulated from the first member, a vibrating armature carried by the second member, contact means carried by the armature and the first member, and means carried by the support for electrically connecting the members of the unit with the electric circuits of the rectifier.

3. In an alternating current rectifier, the combination with a magnetic core having pole pieces, of a support carrying the core, a separable vibratory unit mounted on the support and across the pole pieces, the vibratory unit comprising a casing, a vibratory armature suspended within the casing and insulated therefrom, contact means carried by the casing and the armature, and means carried by the support for electrically connecting the members of the unit with the electric circuits of the rectifier.

4. In an alternating current rectifier, the combination with a magnetic core, of a separable, vibratory unit embodying suitable electric conductors, a support for the core, the support having attaching means forming one permanent electric connection, an attaching screw insulated from the support and forming another permanent electric connection, the vibratory unit being carried by the attaching means and the attaching screw, and means for detachably securing the vibratory unit in position.

5. In an alternating current rectifier, the combination with a magnetic core having poles of a support carrying the core, a separable, vibratory unit mounted on the support and across the poles, the vibratory unit comprising an attaching member, a vibratory armature carried by the attaching member and insulated therefrom, contact means carried by the attaching member and the armature and means carried by the support for electrically connecting the members of the unit with the electric circuits of the rectifier.

6. In an alternating current rectifier, the combination with a magnetic core, having pole pieces, of a separable vibratory unit arranged across the pole pieces, the vibratory unit comprising two attaching members, insulated one from the other, a vibrating armature carried by one of the members, contact means carried by the armature and the other member and means carried by the support for electrically connecting the members of the unit with the electric circuits of the rectifier.

In testimony whereof, I have hereunto signed my name.

VERNON FRANKLIN KING.